UNITED STATES PATENT OFFICE.

OSCAR WARREN PICKERING, OF SPRINGFIELD, MASSACHUSETTS, ASSIGNOR TO PICKERING PAINT & PIGMENT COMPANY, A CORPORATION OF WEST VIRGINIA.

ALUMINOUS PAINT AND PIGMENT.

1,183,665.     Specification of Letters Patent.     Patented May 16, 1916.

No Drawing.     Application filed August 4, 1915. Serial No. 43,616.

*To all whom it may concern:*

Be it known that I, OSCAR WARREN PICKERING, a citizen of the United States, residing at Springfield, in the county of Hampden and State of Massachusetts, have invented certain new and useful Improvements in Aluminous Paint and Pigment, of which the following is a specification.

This invention relates to a new pigment and paint thereof and has for some of its objects the production of a pigment or paint which will have greater spreading power, less disintegrating or decomposing character when exposed to ingredients of or associated with the atmosphere, more permanency or stability when exposed to light, and less specific gravity, whereby the settling out from the paint vehicle is prevented, and which will be more readily miscible with oils or other vehicles than such substances as "white lead," contain less lead and produce greater and better results, and it comprises a compound or composition of metal aluminate and a different metal hydroxid, such as a compound or composition of lead with aluminium and oxygen in the form of lead aluminate or its equivalent combined or associated with a hydroxid such as aluminium hydroxid, and the same associated with a vehicle such as a drying oil of the linseed type and in some cases with a diluent of drying nature such as turpentine, in the form of paint or similar commodity.

When ordinary "white lead" is employed in or as a paint associated with such vehicles as linseed oil and turpentine the specific gravity of the lead compound or composition which comprises a lead carbonate and hydroxid (hydrate) in proportion of approximately two parts of the former and one part of the latter, or chemically $2PbCO_3 - Pb(OH)_2$, is such that it soon separates or settles out from mixed paint and is hard to remix again to a uniform consistency. The lead compound or composition when exposed to the atmosphere is readily attacked and decomposed by sulfur therein and turned black and it is to obviate these and other difficulties that the present invention is devised.

The lead aluminate which is preferred in conjunction with the metal or aluminium hydroxid is the normal aluminate and the pigment is produced by the action of lead acetate on sodium aluminate and sodium hydroxid (caustic soda) thus:

$2Na_2Al_2O_4 + Pb(C_2H_3O_2)_2 + 2HC_2H_3O_2 + 2H_2O = PbAl_2O_4 - Al_2(OH)_6 + 4NaC_2H_3O_2$.

The sodium acetate is washed out of the lead aluminate and lead hydroxid precipitate and the acetic acid recovered by treatment with a stronger acid such as sulfuric. The lead aluminate and lead hydroxid thus produced is thoroughly washed and dried, yielding a white product of superior mixing qualities with oils and producing a paint which readily spreads and presents a body covering of great light diffusive quality.

It will be noted that the lead aluminate and lead hydroxid contains aluminium oxid in place of carbon dioxid of the ordinary "white lead" which is more permanent and less affected by decomposing ingredients of the atmosphere and it more readily assimulates with oils or other paint vehicles and especially with drying oils, such as linseed, tung, and the like, or the same associated with driers such as turpentine.

Instead of a pigment composed of lead aluminate and lead hydroxid, the lead aluminate may be associated with any other metal hydroxid or hydrate, such as aluminium hydroxid, zinc hydroxid, etc., corresponding to "white lead" except that the lead carbonate is substituted by lead aluminate and the lead hydroxid by another metal hydroxid or like lead hydroxid thus:—

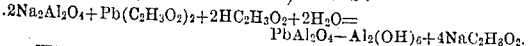

White lead. $2PbCO_3 - Pb(OH)_2$.
New pigment. $2PbAl_2O_4 - Pb(OH)_2$.
Or with different metal hydroxid. $2PbAl_2O_4 - Al_2(OH)_6$.

This compound or composition of lead aluminate and aluminium or other metal hydroxid or hydrate may be produced by acting on sodium aluminate with lead acetate and acetic acid and in cases where aluminium hydroxid is desired associated with lead aluminate as shown in the third formula.

The lead aluminate and aluminium or other metal hydroxid are thrown down or precipitated from the aqueous solution of the compounds referred to in such an intimate state of division and admixture as to prevent the appearance of an actual chemical compound similar to the lead carbonate and lead hydroxid (hydrate) compound or composition of the so-called "white lead."

It will be noted that in the compound comprising lead aluminate and aluminium or other metal hydroxid, the percentage of lead in the compound as compared with that contained in white lead or lead carbonate is reduced and the bulk of the paint increased by the employment of the aluminate and the product is therefore much cheaper as to cost than white lead while at the same time it yields a product of greater superiority over the old form of lead carbonate and hydrate both as to spreading power and resistance to atmospheric decomposition thereby producing a product which is more permanent in character.

It is obvious that the lead aluminate and lead or other metal hydroxid may be produced in any convenient manner other than that described and that the pigment may be associated with any selective vehicle in producing the paint without departing from the spirit of the invention which broadly comprises as a new pigment or paint a metal aluminate and metal hydroxid or its equivalent, or specifically lead aluminate and lead hydroxid or lead aluminate associated or combined with a metal of like or unlike character in the form of a hydroxid or hydrate or specifically lead, aluminium, zinc, or other metal hydroxid or hydrate, or such compounds or compositions associated with a paint vehicle, such as drying oil (linseed) or the same with a drier (turpentine).

The so-called "white lead" contains lead compounds which are slightly soluble in water and produce a poisoning effect when employed, to the painter, the maker and the user, which is largely prevented if not entirely avoided in the making, employment and the use of the less soluble lead aluminate and metal hydroxid in the place of the lead carbonate and lead hydroxid which is contained in white lead.

In the manufacturing, shipping and dispensing of mixed paints the lead aluminate and metal hydroxid pigment is of great utility, in that its lesser gravity than white lead maintains it in a mixed or suspended condition in the paint vehicle, thus avoiding the settling out of the pigment to a great extent and yielding a more uniformly mixed paint and maintained as such, which is of greater utility, durability, spreading power, and practical utility, than pigments and paints of mixed character employed hitherto.

Any metal aluminate may be employed, such as copper, magnesium, chromium, iron, mercury, nickel, calcium, or other metal aluminate, which aluminate may be simple, compound, complex or composite in nature and may be associated with unlike metal hydroxid in chemical combination or physical association without departing from the spirit of the invention and any other metal hydroxid may be substituted for the aluminium hydroxid in the lead aluminate compound or composition, such as aluminium zinc, or other metal hydroxid.

It is obvious that the metal of the aluminate may exist at any atomicity and the aluminate may comprise the normal, basic, or other variety, without departing from the spirit of the invention.

Some of the preferable species of aluminate employed comprise, and in connection with the present invention with preferable reference to cheapness and utility, may be noted as calcium aluminate, copper aluminate, and zinc aluminate, either *per se* or associated or combined with other substances, ingredients or vehicles.

The term or expression "paint" as employed herein is intended to imply and does imply a pigment or dry paint as such or associated with a vehicle or carrier of any suitable kind, preferably of liquid character, capable of enabling the associated pigment or dry paint to be spread on a surface in a coating by means of a brush or its equivalent; the term or expression "vehicle" implies a pigment or dry paint carrier, preferably of fluid nature, which may consist of or comprise any suitable character comprising one which may evaporate entirely, leaving the pigment or dry paint upon the surface or within the pores of the article to which it is applied, such as water, benzine, etc., or the same associated with a paint fixative, such as gum, resin, casein compounds, etc., or it may comprise an oil of any suitable kind such as a petroleum product, vegetable oil of drying or non-drying character, etc., so long as it acts to carry the pigment or dry paint and enhance the spreading thereof by action of a brush or its equivalent, or the oil and pigment may be associated with a suitable fixative or drier; and the term "drier" implies a substance or constituent of the oil or paint composition which is capable of fixing the oil or paint by transforming it into a gelatinous or non-fluid condition by acting as an oxygen carrier to the oil forming a non-fluid oil oxygenated compound, such as linoxyn, or an oil setting or gelatinant, such as metal soap or oleates or resinates either directly employed or formed in the paint by interaction of the ingredients, such as the resin acids formed by oxidation of turpentine and their action on a pigment or dry paint metal compound constituent. For example, the drying or transforming of a fluid non-drying petroleum product or vegetable oil into a non-fluid or fixed gelatinous condition, as a pigment or dry paint vehicle or fixative may be accomplished by associating the pigment or dry paint, such as lead aluminate and non-drying vegetable oil, such as cottonseed oil, with turpentine which, when it is spread on a surface and exposed to oxygen of the air, results in the conversion of the turpentine into resin acid aldehydes, which unite with the lead and aluminium content forming resinates, also the oil or propenyl or glyceryl oleate, reacts, with the lead aluminate forming lead glycerinate, lead and aluminium oleate and resin and aliphatic or oleac acid ethers, all of which products, resinates, oleates, glycerinates and others increase the viscosity, absorb, combine with, retain, or occlude the excess of oil and the pigment transforming the whole into a gelatinous or non-fluid and substantially dry condition, just as water is retained or dried by gelatin or glue, in this manner oils of ordinarily non-drying character may be employed as well as drying oils as paint vehicles with and for pigments of the metal aluminate variety.

Having now described my invention what I claim as new and desire to secure by Letters Patent is:—

1. A new pigment comprising a metal aluminate and a different metal hydroxid.
2. A new pigment comprising lead aluminate and a different metal hydroxid.
3. A new pigment comprising lead aluminate and aluminium hydroxid.
4. A paint comprising a metal aluminate, a different metal hydroxid, and a vehicle.
5. A paint comprising lead aluminate, a different metal hydroxid, and a vehicle.
6. A paint comprising lead aluminate, aluminium hydroxid, and a vehicle.
7. A paint comprising metal aluminate, a different metal hydroxid, and an oil.
8. A paint comprising lead aluminate, a different metal hydroxid, and an oil.
9. A paint comprising lead aluminate, aluminium hydroxid, and an oil.
10. A paint comprising metal aluminate, a different metal hydroxid, and a drying oil.
11. A paint comprising lead aluminate, a different metal hydroxid, and a drying oil.
12. A paint comprising lead aluminate, aluminium hydroxid, and a drying oil.
13. A paint comprising metal aluminate, a different metal hydroxid, an oil, and a drier.
14. A paint comprising lead aluminate, a different metal hydroxid, an oil, and a drier.
15. A paint comprising lead aluminate, aluminium hydroxid, an oil, and a drier.
16. A paint comprising metal aluminate, a different metal hydroxid, a drying oil, and a drier.
17. A paint comprising lead aluminate, a different metal hydroxid, a drying oil, and a drier.
18. A paint comprising lead aluminate, aluminium hydroxid, a drying oil, and a drier.
19. A paint comprising metal aluminate, a different metal hydroxid, an oil, and turpentine.
20. A paint comprising lead aluminate, a different metal hydroxid, an oil, and turpentine.
21. A paint comprising lead aluminate, aluminium hydroxid, an oil, and turpentine.
22. A paint comprising metal aluminate, a different metal hydroxid, a drying oil, and turpentine.
23. A paint comprising lead aluminate, a different metal hydroxid, a drying oil, and turpentine.
24. A paint comprising lead aluminate, aluminium hydroxid, a drying oil, and turpentine.

In testimony whereof I affix my signature in the presence of two witnesses.

OSCAR WARREN PICKERING. [L. S.]

Witnesses:
F. L. WHRITNER,
JAMES H. SCOTT.